United States Patent [19]

Komine et al.

[11] Patent Number: 5,220,418
[45] Date of Patent: Jun. 15, 1993

[54] IMAGE PROCESSING APPARATUS WHICH THINS OUT PREDETERMINED COLOR SIGNALS

[75] Inventors: Takayuki Komine, Kawasaki; Tomishige Taguchi, Urawa; Tsuguhide Sakata, Machida, all of Japan

[73] Assignee: Canon Kabushiki Kaisha, Tokyo, Japan

[21] Appl. No.: 758,213

[22] Filed: Sep. 12, 1991

Related U.S. Application Data

[63] Continuation of Ser. No. 412,592, Sep. 26, 1989, abandoned, which is a continuation of Ser. No. 51,459, May 19, 1987, abandoned.

[30] Foreign Application Priority Data

May 21, 1986 [JP] Japan ................ 61-116381

[51] Int. Cl.⁵ .................................. H04N 1/46
[52] U.S. Cl. .................................. 358/78; 358/75
[58] Field of Search ............... 358/75, 78, 80, 12, 358/909

[56] References Cited

U.S. PATENT DOCUMENTS

| | | | |
|---|---|---|---|
| 3,507,981 | 4/1970 | Eilenberger | 358/12 |
| 4,270,141 | 5/1981 | Sakamoto | 358/75 |
| 4,274,111 | 6/1981 | Murase | 358/75 |
| 4,667,228 | 5/1987 | Kawamura et al. | 358/32 |
| 4,734,759 | 3/1988 | Kobori et al. | 358/78 |
| 4,780,756 | 10/1988 | Shiota et al. | 358/78 |
| 4,864,391 | 9/1989 | Taguchi | 358/80 |

OTHER PUBLICATIONS

"Pictures via phone line", Monitor-Proc. IREE, vol. 37, No. 4, p. 104, Apr. 1976.
"Color Video Picture Printer", IEEE Trans. on Consumer Electronics, vol. CE-28, No. 3, pp. 226-230, Aug. 1982.

*Primary Examiner*—Edward L. Coles, Sr.
*Assistant Examiner*—Kim Yen Vu
*Attorney, Agent, or Firm*—Fitzpatrick, Cella, Harper & Scinto

[57] ABSTRACT

A color image processing apparatus which decomposes an image signal into color components. The decomposed color components are converted to sequential picture signals. Information on certain color components of the converted sequential picture signal is thinned out and transmitted. The color component signals are stored in respective memories. Certain color component signals are read out in their entirety, while only predetermined portions of other color component signals are read out.

19 Claims, 7 Drawing Sheets

| 1 | 3 | 2 | 5 | 4 | 7 | 6 | ---- |
|---|---|---|---|---|---|---|------|
|   |   |   |   |   |   |   | ---- |
|   |   |   |   |   |   |   | ---- |

1,2,3····: ORDER OF WRITING INTO MEMORY

3 : MEAN OF 1 AND 2
5 : MEAN OF 2 AND 4
7 : MEAN OF 4 AND 6

IMAGE PROCESSING APPARATUS WHICH THINS OUT PREDETERMINED COLOR SIGNALS

This application is a continuation of application Ser. No. 07/412,592 filed Sept. 26, 1989, which is a continuation of Ser. No. 07/051,459, filed May 19, 1987, both now abandoned.

BACKGROUND OF THE INVENTION

1. Field of the Invention

This invention relates to an image processing apparatus having a function of transmitting static image data.

2. Related Background Art

One conventional method of transmitting color picture information for one field (or one frame) using narrow bond circuits such as telephone circuits includes converting the time base of the image data stored in R, G and B picture field memories (or frame memories) and transmitting all the image data sequentially in pictures.

For example, in a static image recording system standardized as a video floppy, a brightness signal and sequential color difference line signals are recorded by frequency modulation and, when read, the color difference line signals are interpolated for each line to recover the R, G and B images to thereby transmit the image data sequentially in frames.

However, this system has the drawback that the time required for transmission and reception of a static color image is three times as much as that for a static black and white image because three different color pictures are transmitted and received sequentially in frames.

SUMMARY OF THE INVENTION

It is an object of this invention to provide an image transmitting method and apparatus which eliminates the above problems and is capable of transmitting a high quality image signal rapidly.

It is another object of this invention to provide an image transmitting method and apparatus which is capable of interpolating data well on the reception side, the data being thinned out in advance on the transmission side.

It is a further object of this invention to provide an image transmitting method and apparatus which is capable of data compression suitable for an image transmitting apparatus which converts a color image signal to sequential frame signals and transmits them.

According to a preferred embodiment of this invention an image transmitting apparatus is disclosed which decomposes a static color image signal into respective color components, transmits these components sequentially in frames, wherein particular color information is transmitted on a compressed time base and in a time division base.

It is a further object of this invention to provide an image transmitting method and apparatus suitable for transmitting an image signal recorded in accordance with the standard of a magnetic video floppy.

These and other objects and features of this invention will be apparent from the following description of embodiments thereof and the drawings.

DETAILED DESCRIPTION OF PREFERRED EMBODIMENTS

Figure 1:
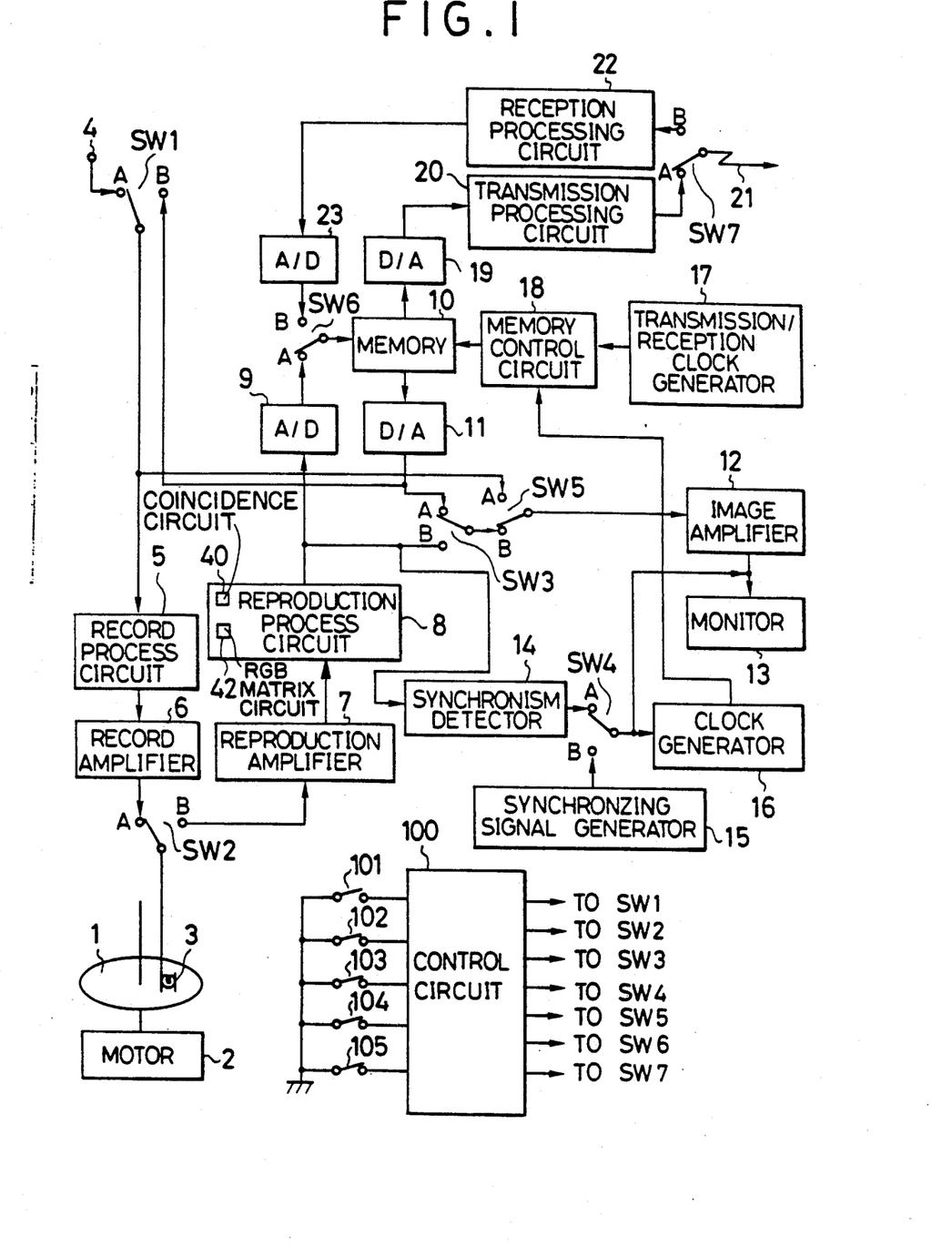
FIG. 1 is an entire schematic showing one embodiment of this invention.

FIG. 1 is a block diagram showing one embodiment of a color transmitter-receiver suitable for this invention. In FIG. 1, reference numeral 1 denotes a rotating magnetic sheet used as a recording medium which has thereon a plurality of concentric tracks on which an image signal can be recorded and from which an image signal can be reproduced and erased, like a floppy disk. As described above, the tracks contain FM recorded brightness and sequential color difference line signals. Reference numeral 2 denotes a disc motor (for example, DC motor) which rotates magnetic sheet 1. Reference numeral 3 denotes a magnetic head which records and reproduces an image signal on and from magnetic sheet 1.

Reference numeral 4 denotes an input terminal for image signals (R, G, B, SYNC). Reference numeral 5 denotes a record process circuit which converts the input image signal from input terminal 4 to a signal suitable for magnetic recording and reproduction (by frequency modulating the brightness signal and the sequential color difference line signals).

Reference numeral 6 denotes a record amplifier which amplifies the output signal from record process circuit 5. Reference numeral 7 denotes a reproduction amplifier which amplifies a signal reproduced by magnetic head 3. Reference numeral 8 denotes a reproduction process circuit (reproduction signal demodulator) which demodulates and outputs the original image signal from the output signal of reproduction amplifier 7. It is to be noted that reproduction process circuit 8 includes an FM demodulator and a coincidence circuit 40 which makes the sequential color difference line signals coincident to obtain a coincident signal, and an RGB matrix circuit 42 which separates the synchronous signal into R, G and B components.

Reference numeral 9 denotes an A to D converter which converts an analog image signal output from reproduction process circuit 8 to a digital signal. While in FIG. 1, only one A to D converter is shown, three A to D converters are actually provided to convert image signals, which are decomposed into R, G and B components, to the corresponding digital signals.

Figure 2:
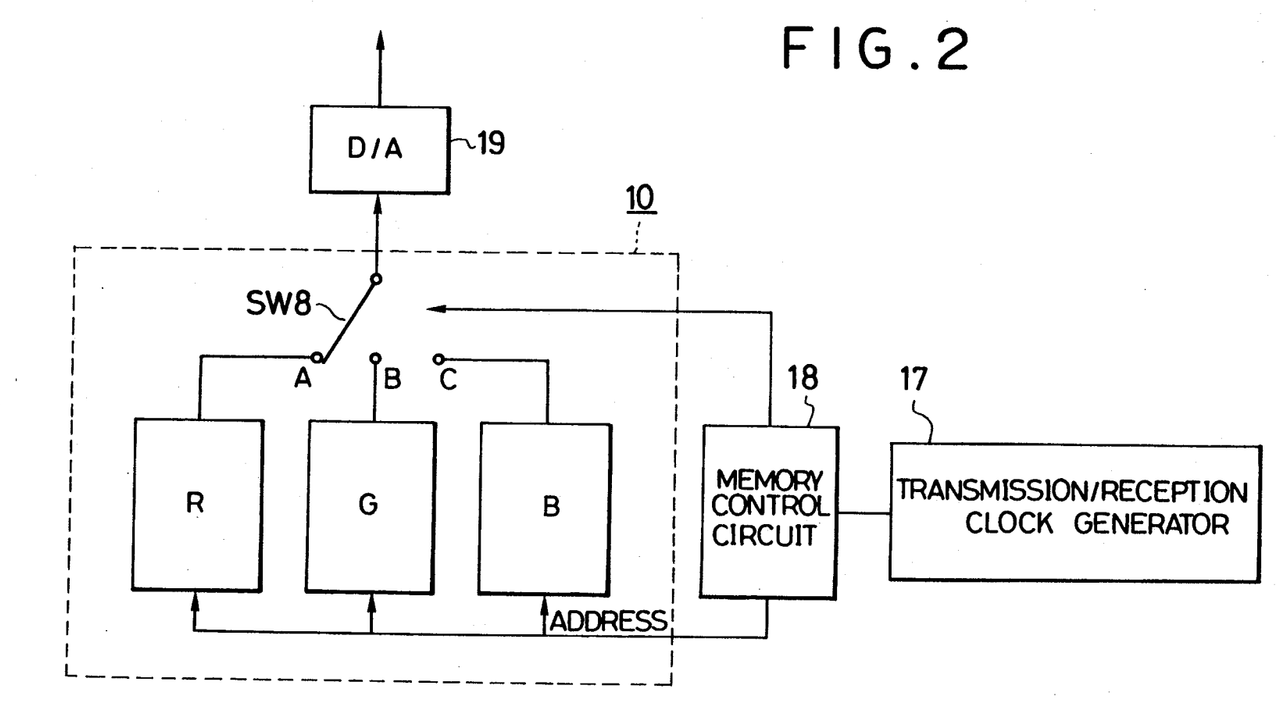
FIGS. 2 and 3 each illustrate the transmitting operation of the embodiment shown in FIG. 1.

Reference numeral 10 denotes frame memories, one for each of R, G and B pictures, as shown in FIG. 2. These memories store data on R, G and B digital image signals output from A to D converter 9 or 23 (the latter will be described in more detail later).

Reference numeral 11 denotes a D to A converter which reconverts a digital image signal read from frame memories 10 to a corresponding analog signal. It is to be noted that while only one D to A converter 11 is shown in FIG. 1, three D to A converters 11 are actually provided to convert the signals read from the corresponding frame memories 10 at a video rate.

Reference numeral 12 denotes an image amplifier which amplifies the respective R, G and B component image signals output from input terminal 4, reproduction process circuit 8 or D to A converter 11 by changing switches to be described later in more detail. Reference numeral 13 denotes a monitor television which visualizes the output of image amplifier 12.

Reference numeral 14 denotes a synchronism detector which detects the presence of a synchronous signal in the reproduction signal. Reference numeral 15 denotes a synchronizing signal generator.

Reference numeral 16 denotes a clock generator which outputs a reference signal to address the frame memories 10 synchronously with a synchronizing signal input via a switch SW4 to be described in more detail later.

Reference numeral 17 denotes a transmission/reception clock generator which generates a reference clock pulse signal to drive frame memories 10 when an image signal is to be transmitted/received using telephone circuits.

Reference numeral 18 denotes a memory control circuit which addresses frame memories 10 on the basis of a clock pulse sent from clock generator 16 or transmission/reception generator 17.

Reference numeral 19 denotes a D/A converter which converts a digital image signal read from frame memories 10 to an analog signal. Reference numeral 20 denotes a transmission processing circuit which performs transmission processing (for example, amplitude modulation) to transmit an analog signal, converted by D/A converter 19, via telephone circuit 21.

Reference numeral 22 denotes a reception processing circuit which receives and demodulates a signal, for example, an AM signal, sent by telephone circuit 21. Reference numeral 23 denotes an A/D converter which converts an analog signal, demodulated by reception processing circuit 22, to a digital signal.

Reference numerals SW1-SW7 denote change-over switches.

The operation of this embodiment having the above structure will now be illustrated in detail.

(A) Recording an image signal on a track formed on magnetic sheet 1 will be described first. In response to closing a record switch 101, control circuit 100 sets switches SW1, SW2, SW5 to their respective terminals A. Thus R, G, B and SYNC image signals input via image signal terminal 4 are input to record process circuit 5. Simultaneously, the image signal from terminal 4 is input to image amplifier 12 and displayed as a visual image on monitor 13.

The R, G, B and SYNC image signals input to record process circuit 5 are first converted to a color difference signal and a brightness signal which are then frequency modulated together into a frequency-multiplexed signal. The color difference signal is converted by process circuit 5 to sequential line signals which include an FM signal lower in frequency band than the brightness signal which is frequency modulated in a high frequency bond.

The frequency-multiplexed FM signal output from record process circuit 5 is amplified by record amplifier 6 when SW2 is connected to its A contact, and the amplified signal is input to magnetic head 3 which then records the image signal for one field as one track on magnetic sheet 1.

(B) The reproduction of an image signal recorded on magnetic sheet 1 will now be described.

When reproduction switch 102 is closed, control circuit 100 changes the respective switches SW2, SW3 and SW5 to their respective terminals B.

During reproduction, SW2 is connected to its contact B. Thus, magnetic head 3 reads an image signal recorded on a track formed on magnetic sheet 1 and sends the reproduced signal to reproduction amplifier 7. Amplifier 7 amplifies a small signal (reproduced signal) from magnetic head 3 and inputs it to reproduction process circuit 8.

Reproduction process circuit 8 demodulates the FM frequency multiplexed signal to obtain sequential color difference line signals and a brightness signal, making the color difference signals coincident, matrix processes the color difference signals and brightness signal, and outputs, R, G, B and SYNC image signals. Reproduction process circuit 8 includes an internal skew compensation circuit (not shown), so that during field reproduction, the circuit 8 outputs a signal skewed by the skew compensation circuit.

The image signal output from reproduction process circuit 8 is output through switches SW3 and SW5 to monitor 13. The image signal output from reproduction process circuit 8 is also input to A/D converters 9 where the image signal is converted to the corresponding digital signal. Simultaneously, the synchronizing signal (SYNC) output from reproduction process circuit 8 is detected by synchronism detector 14 and input through switch SW4 to clock generator 16. This causes a reference clock pulse signal synchronous with the reproduction signal to be produced. The reference clock pulse signal thereby causes memory control 18 to form a write clock pulse. Thus, pressing a write instruction switch (not shown) causes a frame of an image signal, converted to a digital signal, to be stored in memories 10.

(C) The reproduction of an image signal written into frame memories 10 will now be described.

In response to closing memory reproduction switch 103, control circuit 100 sets switch SW3 to its terminal A, and sets switches SW4 and SW5 to their respective terminals B. This causes a synchronizing signal, output from synchronizing signal generator 15, to be input to clock generator 16 to generate a reference clock pulse which is input to memory control circuit 18, thereby forming a read clock pulse to read frame memories 10.

The digital image signal read from frame memories 10 is converted by D/A converter 11 to an analog signal which is then displayed via switches SW3 and SW5 on monitor 13.

(D) The transmission of an image signal using telephone circuit 21 will be performed as follows.

Closing transmission switch 104 causes switches SW6 and SW7 together to be set to their terminals A.

The image signal information to be sent includes the image information stored in memories 10. It is read by a reference clock pulse sent by transmission/reception clock generator 17, amplitude-or frequency-modulated by transmission processing circuit 20, and transmitted via switch SW7 to telephone circuit 21. The frequency band width for the image information read from memories 10 at this time is typically about 4.2 MHz. However, the frequency band width of a public telephone circuit is about 3 KHz, so that the time base must be changed. Thus, in this embodiment, the reference clock pulse signal generated by transmission/reception clock generator 17 is set so as to have a frequency low enough compared to the clock frequency generated by clock generator 16 to read the image signal slowly from memories 10, thereby changing the time base.

The transmission process of this embodiment will now be described in detail with reference to FIG. 2.

When transmission switch 104 is closed, all of the image data for one picture is sent via switch SW8 from frame memories 10 for three R, G and B pictures.

Memory control circuit 18 thins out every other pixel of R image data for one line and outputs the resulting data to D/A converter 19. Similarly, memory control circuit 18 thins out every other pixel of B image data for one line and outputs the resulting data D/A converter 19.

By repetition of this operation, the R and B pixel data for one frame (or one field) is reduced in number by one half, so that data for two R and B colors are transmitted in the transmission time required conventionally for transmitting data for one color.

Figure 3:
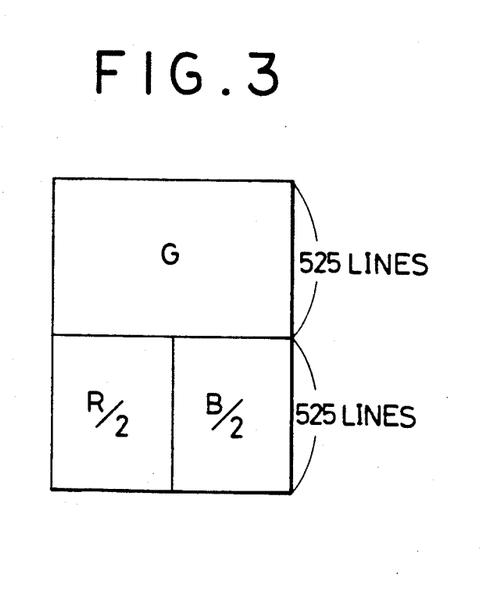

FIG. 3 shows an arrangement of transmission data, thus obtained, for each line. It is to be noted that the transverse and lengthwise directions in FIG. 3 correspond to those in the frame. It is also to be noted that an upper half of FIG. 3 shows G data of one picture while a lower half shows R and B data, each compressed in time base by one half and transmitted.

(E) The reception of an image signal sent via telephone circuit 21 is as follows.

In response to closing reception switch 105, switches SW6 and SW7 are set to their respective terminals B. Namely, during reception, the image signal (namely, an AM or FM image signal whose time base is changed) sent via telephone circuit 21 is demodulated by reception processing circuit 22, digitized by A/D converter 23 and written into memories 10 synchronously with a reference clock pulse output from transmission/reception clock generator 17.

Figure 4:
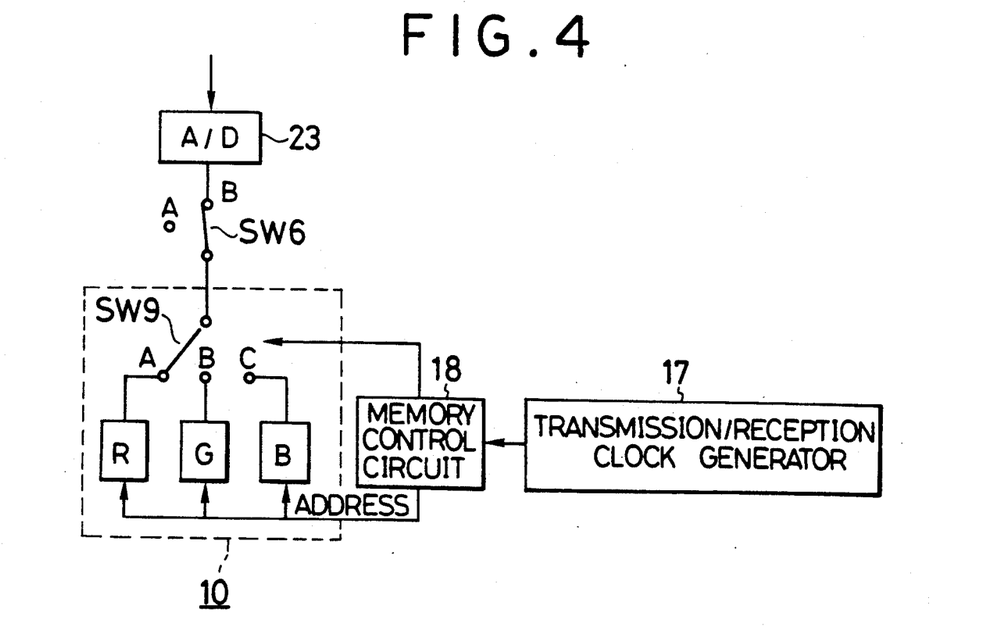
FIGS. 4 and 5 each illustrate the receiving operation of the embodiment shown in FIG. 1.

The reception process in this embodiment will now be described in detail with reference to FIG. 4. FIG. 4 illustrates the operation of memories 10, memory control 18 and transmission/reception clock generator 17 in a state of reception.

The image information transmitted through telephone circuit 21 (see FIG. 1) has a structure shown in FIG. 3. First, switch SW9 is connected to its terminal B to store the information for one frame (or for one field) in the G picture frame memory. Switch SW9 is changed over between terminals A and C for each half of one line to write data on every other pixel into the corresponding one of R and B frame memories. In this case, when data for two pixels has been written, the average of the two pixels is calculated and the resulting information is written between the two pixels. Such interpolation is performed by memory control circuit 18.

Figure 5:
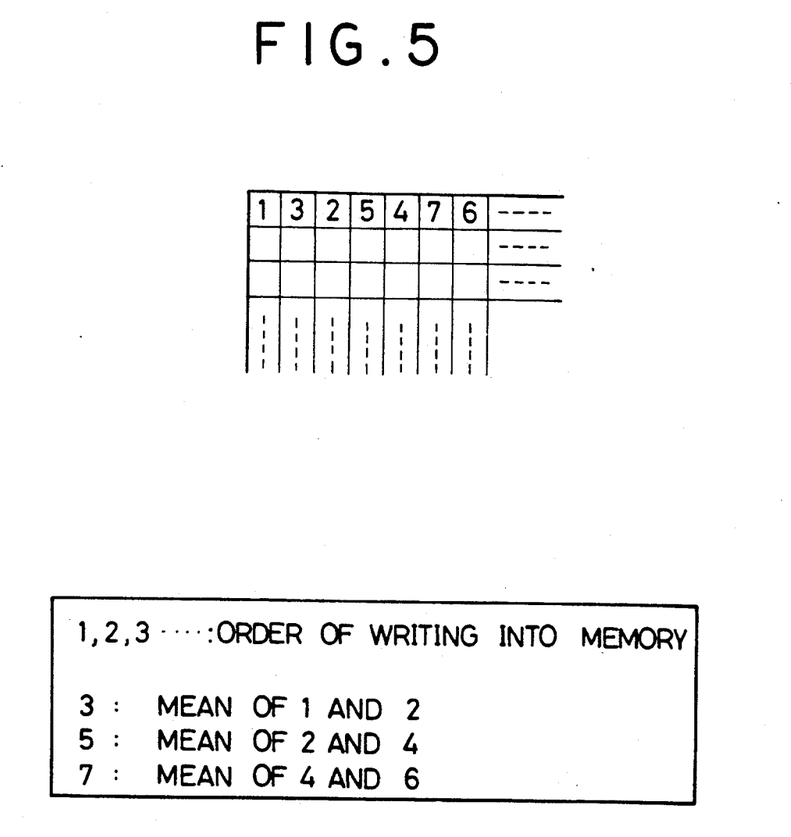

FIG. 5 shows the order in which the information is written into the memories. In FIG. 5, each small rectangle shows one pixel and a numeral given in each rectangle shows the order in which the information is written into the memories. This results in data for one frame (or one field) when the reception has ended although the quantity of transmitted information on R and B pictures may be one half of the original quantity of information.

Figure 6:
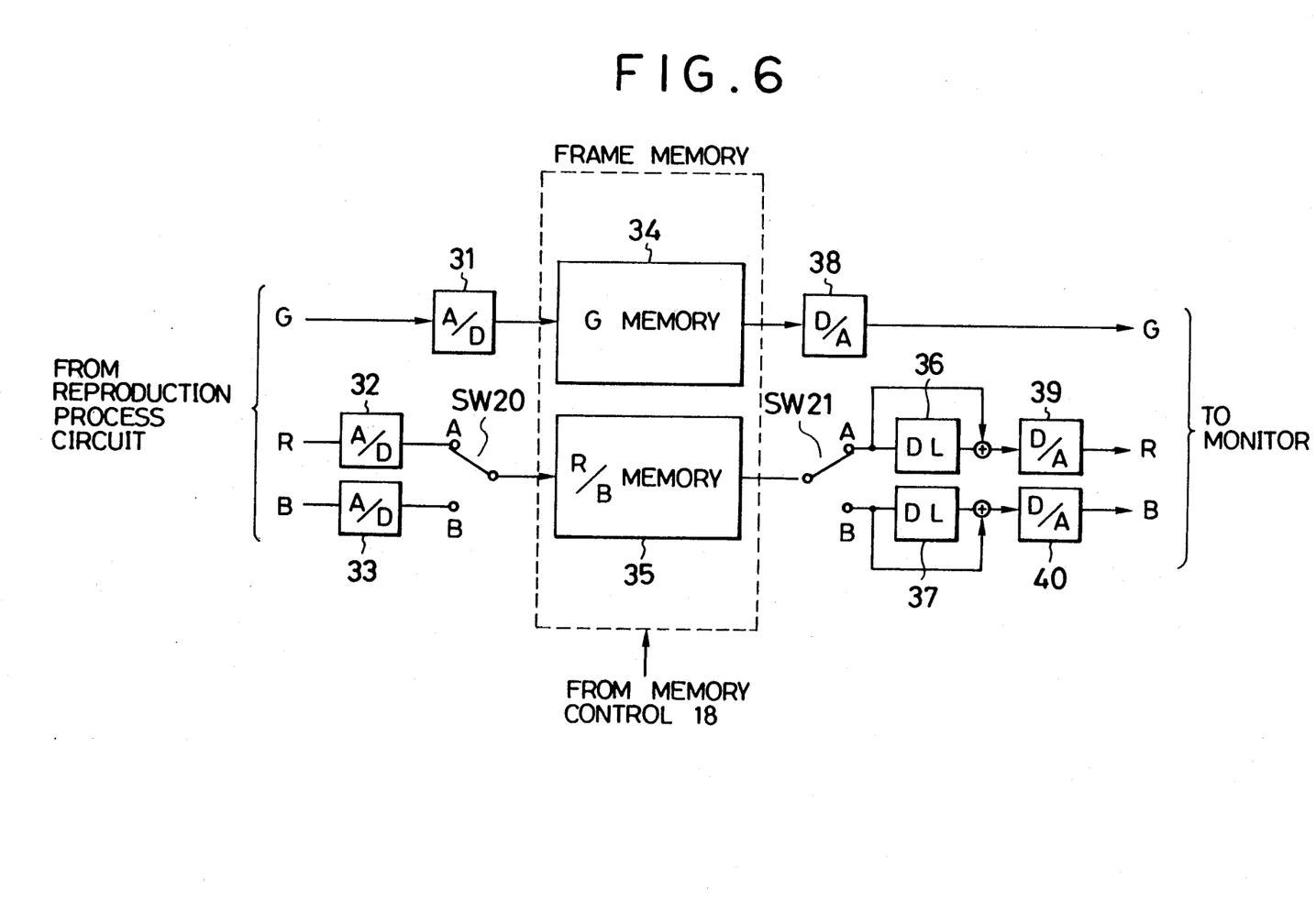
FIG. 6 is a block diagram showing a second embodiment of this invention.

FIG. 6 is a block diagram showing another embodiment. In this embodiment, a requisite capacity of a reception frame memory is two thirds of that in the first embodiment of FIG. 2. This embodiment will now be described in more detail.

In FIG. 6, reference numerals 31-33 denote A/D converters which receive G, R and B signals output from reproduction process circuit 8 (see FIG. 1). Reference numeral 34 denotes a G-surface frame memory. Reference numeral 35 denotes an R/B picture frame memory. Reference numerals 36 and 37 denote delay lines which delay signals, introduced via switch S21, by one sample interval and outputs the same data in units of two pixels. Reference numerals 38-40 denote D/A converters.

Switch SW20 changes data, written into R/B picture frame memory 35, at each sample clock pulse. Switch SW21 distributes the alternately read R and B data at each sample clock pulse to the corresponding one of terminals A and B.

The use of such memory structure causes all the G data to be written into the G picture frame memory 34 and the R and B data, thinned out to one half, to be respectively written into R and B picture frame memory 35.

When the data stored in memories 34, 35 is to be transmitted, all the stored data in the G picture memory is transmitted. Each line of R and B data written in R and B frame memory 35 is then transmitted (namely, memory control circuit 18 controls memories 34 and 35 so that the R and B data contained in one line is transmitted in this order). This causes the image signal in a format shown in FIG. 3 to be transmitted.

Figure 7:
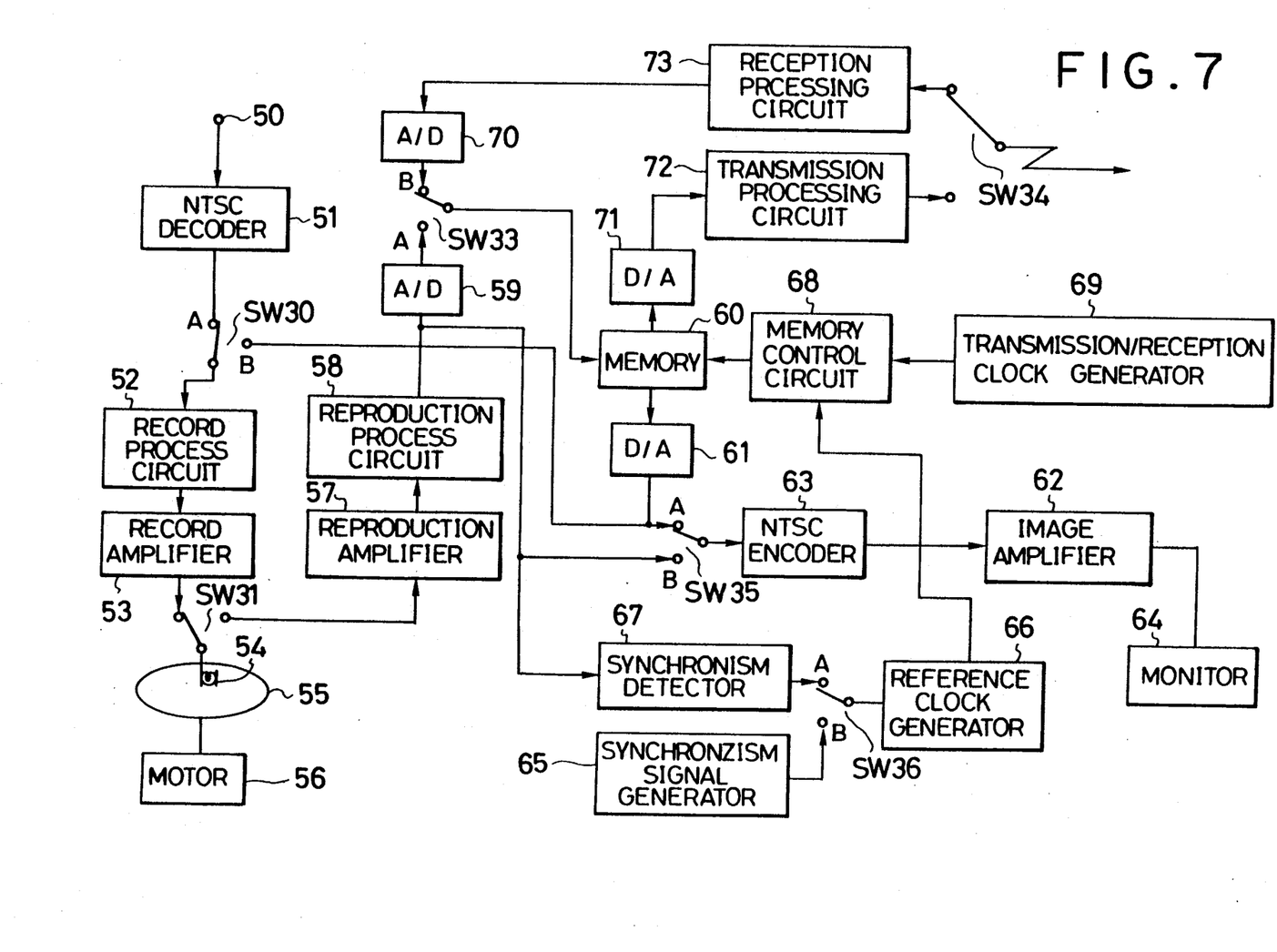
FIG. 7 is a block diagram showing a third embodiment of this invention.

FIG. 7 is a block diagram showing a third embodiment of this invention. In the above first and second embodiments, every other pixel of the R and B image data is transversely thinned out to thereby shorten the time required for transmission and reception. In contrast, in the third embodiment shown in FIG. 7, the brightness signal and the sequential color difference line signals are arranged to be stored in their respective memories, as shown in the memory configuration of FIG. 8. Namely, in this embodiment, R and B information present lengthwise in a picture is arranged to be thinned out by one half.

The structure of the embodiment shown in FIG. 7 is basically similar to that of FIG. 1 except that reference numeral 50 denotes an input terminal for an NTSC signal, reference numeral 51 denotes an NTSC decoder which converts the input NTSC signal to a brightness signal and sequential color difference line signals, and reference numeral 63 denotes an NTSC encoder. The signals between NTSC decoder and encoder 51 and 63 are handled as a brightness signal and sequential color difference line signals and made coincident by encoder 63 for a color difference line.

In this embodiment, first, 525 lines, namely, one image, of Y data are transmitted and one frame of R−Y, B−Y data is then transmitted sequentially line by line to thereby perform a transmission and reception free from missing information.

Figure 8:
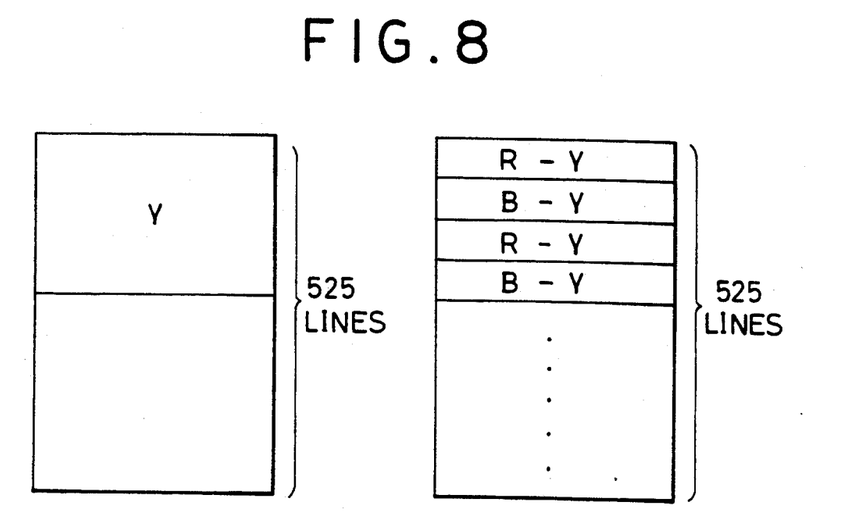
FIG. 8 is a schematic of a memory 60 shown in FIG. 7.

As described above, in the third embodiment, information is written into memory 60 in the same format (Y+S, R−Y/B−B) as the signal stored in magnetic sheet 55, so that an apparatus is provided in which no information is missing and no excess information is required to be transmitted and received.

Also, in the third embodiment, a transmission method such as that described with respect to FIG. 3 may be performed. First, G image data for one frame is produced from the signal written into memory 60 and transmitted. This data is then added to Y and R−Y, B−Y, respectively, to obtain R image data for one line, every other pixel of this R image data is then thinned out, and this thinned-out data is transmitted to D/A converter 19. Similarly, every other pixel of B image data is thinned out and transmitted to D/A converter 19. Thus, the transmitted data shown in FIG. 3 is obtained.

In such data transmission, the G image data (highly contributory to the brightness signal) is all transmitted, and every other pixel of R and B image data (less contributory to the brightness signal) is thinned out and transmitted to thereby transmit information without reducing the quantity of information for the entire picture.

Figure 9:
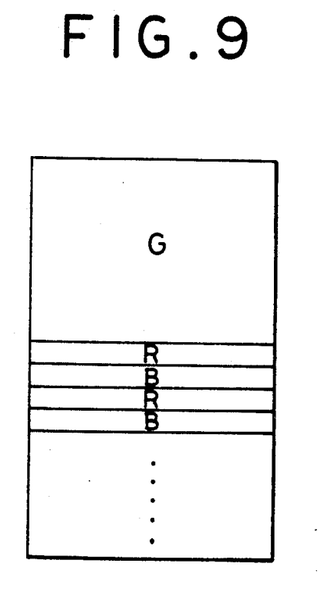
FIGS. 9 and 10 illustrate other examples of transmitted data.

Transmitted data such as that shown in FIG. 9 which is different from the example of FIG. 3 may be obtained by driving switch SW8 shown in FIG. 2. In more detail, G image data for one frame is first transmitted to D/A converter 19, R (which may be replaced with R−Y) image data for one line, and B (which may be replaced with B−Y) image data for one line are then transmitted to D/A converter 19. In such a manner, other R (or R−Y) and B(or B−Y) image data are transmitted in units of one line of data to D/A converter 19.

Thus, this embodiment is a data processing system close to a static picture recording system standardized as the above described video floppy compared to the embodiment of FIG. 3 and is relatively easy to process signals. Color reproduction at the end which has received static picture information transmitted by such a system is good if primary color signals are used instead of color difference signals.

The use of transmitted data corresponding in structure to the memory shown in FIG. 8 renders the information in A/D converter 59 more or less complex because the data takes positive and negative values due to sequential color difference line signals.

Figure 10:
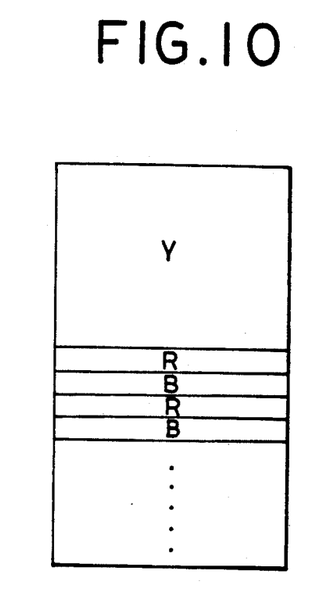

In contrast, transmitted data such as that shown in FIG. 10 is obtained by first transmitting Y image data for one picture to D/A converter 19, transmitting R and B image data sequentially line by line such that R image data for one line is transmitted and B image data for one line is then transmitted. In this case, sequential color difference line signals are not used, so that the structure of A/D converter 59 is relatively simple. This applies similarly in obtaining transmitted data as shown in FIG. 2.

In the transmitted data shown in FIG. 9, G image data and R and B image data may come out of synchronization for some reason. This deviation may appear as a marked color shift. On the other hand, in the transmitted data shown in FIG. 10, Y image data is transmitted instead of G image data, so that such a color shift is less marked.

In order to obtain Y image data among the transmitted data shown in FIG. 10, image data may be read from the R, G and B memories at very high speeds using switch SW8 shown in FIG. 2 and the read data may then be processed.

As described above, according to this invention, the transmission time is shortened without degrading the image quality to thereby accomplish rapid static image transmission.

We claim:
1. A color image processing apparatus comprising:
 a) means for decomposing an image signal into color component signals;
 b) a plurality of frame memories each storing a frame of a respective one of said color component signals;
 c) means for reading out said color component signals, said reading means reading out a color component signal corresponding to a first predetermined color by one frame, and reading out a thinned-out color component signal corresponding to a second predetermined color; and
 d) means for transmitting the thinned-out color component signal read out by said reading means and transmitting the color component signal corresponding to the first predetermined color read out by said reading means, by one frame.

2. A color image processing apparatus of claim 1, wherein the decomposing means includes an R, G and B matrix circuit.

3. A color image processing apparatus of claim 1, wherein the transmitting means includes means for transmitting information via a telephone circuit.

4. A color image processing method comprising the steps of:
 a) decomposing an image signal into a plurality of color component signals;
 b) writing the color component signals into respective frame memories;
 c) sequentially reading out from said frame memories (1) color component signals corresponding to a first predetermined color by one frame, and (2) a thinned-out color component signal corresponding to at least a second predetermined color; and
 d) transmitting the thinned-out color component signal read out in said reading step and transmitting the color component signal corresponding to the first predetermined color read out in said reading step, by one frame.

5. A color image processing method of claim 4, further comprising the step of:
 (d) transmitting the color component signals and the predetermined portion of the color component signals read out in said reading step.

6. A color image processing method of claim 5, wherein the transmitting step includes transmission via a telephone circuit.

7. A color image processing method of claim 4, wherein the at least second predetermined color includes red and blue colors.

8. Image processing apparatus for processing a color image signal including a brightness signal and a plurality of sequential color difference line signals, comprising:
 a) means for obtaining primary color component signals from the brightness signal and the sequential color difference line signals;
 b) a plurality of frame memories each storing a respective color component signal obtained by said obtaining means; and
 c) means for transmitting one frame of a color component signal stored in said frame memories, which corresponds to a first predetermined color, and for thinning-out and transmitting a color component signal stored in said frame memories, which corresponds to at least a second predetermined color, wherein the thinned-out color component signal corresponding to at least the second predetermined color is transmitted after one frame of the color component signal corresponding to the first predetermined color is transmitted.

9. Apparatus of claim 8, wherein the obtaining means includes an R, G and B matrix circuit.

10. Apparatus of claim 8, further comprising:

d) means for reproducing the brightness signal and color difference signals recorded in a recording medium.

11. Apparatus of claim 8, wherein the transmitting means includes means for reading information for each of a plurality of pixels from frame memories corresponding to B and R color component signals.

12. Apparatus of claim 11, wherein said transmitting means includes means for first reading a G color component signal for one picture frame, then reading predetermined portions of at least one of the R and B color component signals for said one picture frame, and then transmitting the signals read for said one picture frame.

13. A method of processing a color image signal having a brightness signal and sequential color difference line signals, comprising the steps of:
   a) obtaining primary color component signals from the brightness signal and the sequential color difference line signals;
   b) transmitting one frame of a color component signal;
   c) compressing R and B color component signals by one half in a horizontal direction, respectively; and
   d) transmitting the compressed R and B color component signals, respectively after a G color component signal for one frame is transmitted.

14. A method of claim 13, further comprising the step of:
   e) reproducing said brightness signal and said sequential color difference line signal from a medium.

15. A method of claim 14, wherein said brightness signal and said sequential color difference line signals are frequency modulated and recorded on said medium.

16. A color image processing method comprising the steps of:
   providing a plurality of color component signals;
   writing the plurality of color component signals into respective frame memories; and
   reading out from said frame memories (1) color component signals corresponding to a first predetermined color by one frame, and (2) a compressed color component signal corresponding to at least a second predetermined color that is different from the first predetermined color; and
   transmitting the compressed color component signal read out in said reading step and transmitting the color component signal corresponding to the first predetermined color read out in said reading step, by one frame.

17. A method according to claim 16, wherein said first predetermined color component comprises a luminance component.

18. A method according to claim 16, wherein said second predetermined color component includes an R component and a B component.

19. A method according to claim 16, wherein said compressed color component signal comprises a thinned-out color component signal.

* * * * *

UNITED STATES PATENT AND TRADEMARK OFFICE
CERTIFICATE OF CORRECTION

PATENT NO. : 5,220,418
DATED : June 15, 1993
INVENTOR(S) : TAKAYUKI KOMINE, ET AL.

It is certified that error appears in the above-indentified patent and that said Letters Patent is hereby corrected as shown below:

COLUMN 1
    Line 17, "bond" should read --band--.
    Line 52, "tion" should read --tion,--.

COLUMN 3
    Line 62, "bond" should read --band--.

COLUMN 5
    Line 14, "data D/A" should read --data to D/A--.

COLUMN 10
    Line 11, "reading out" should read --sequentially reading out--.

Signed and Sealed this

Fifth Day of April, 1994

Attest:

BRUCE LEHMAN

*Attesting Officer*  Commissioner of Patents and Trademarks